United States Patent
Roumieu et al.

(10) Patent No.: US 8,425,159 B2
(45) Date of Patent: Apr. 23, 2013

(54) PROCESS FOR CONVEYING POWDERY MATERIALS WITHOUT SEGREGATION

(75) Inventors: Raymond Roumieu, Aix-en-Provence (FR); Mehrdji Hemati, Pins Justaret (FR); Cécile Plais, Muret (FR); Jean-Marc Rousseaux, Aix-en-Provence (FR); Christian Cloue, Gardanne (FR)

(73) Assignee: Rio Tinto Alcan International Limited, Montreal (CA)

( * ) Notice: Subject to any disclaimer, the term of this patent is extended or adjusted under 35 U.S.C. 154(b) by 382 days.

(21) Appl. No.: 12/669,499

(22) PCT Filed: Jun. 26, 2008

(86) PCT No.: PCT/FR2008/000903
§ 371 (c)(1),
(2), (4) Date: Jan. 18, 2010

(87) PCT Pub. No.: WO2009/010667
PCT Pub. Date: Jan. 22, 2009

(65) Prior Publication Data
US 2010/0189518 A1 Jul. 29, 2010

(30) Foreign Application Priority Data
Jul. 19, 2007 (FR) .................................. 07 05227

(51) Int. Cl.
*B65G 53/18* (2006.01)
(52) U.S. Cl.
USPC .................................................. 406/89
(58) Field of Classification Search ............. 406/89, 406/90
See application file for complete search history.

(56) References Cited

U.S. PATENT DOCUMENTS

| | | | |
|---|---|---|---|
| 3,268,264 A | 8/1966 | Squires | |
| 4,016,053 A * | 4/1977 | Stankovich et al. | 205/392 |
| 4,659,263 A | 4/1987 | Hanrot et al. | |

(Continued)

FOREIGN PATENT DOCUMENTS

| | | |
|---|---|---|
| EP | 0179055 B | 3/1988 |
| EP | 1086035 B | 9/2002 |
| FR | 2534891 A1 | 4/1984 |

OTHER PUBLICATIONS

International Search Report dated Jan. 13, 2009 (PCT/FR2008/000903); ISA/EP.

(Continued)

*Primary Examiner* — Gene Crawford
*Assistant Examiner* — William R Harp
(74) *Attorney, Agent, or Firm* — Banner & Witcoff, Ltd.

(57) ABSTRACT

A process for transporting a powder material, in which a device is fitted between a supply zone and a zone to be supplied, the device including at least one substantially horizontal conveyor which includes a lower duct and an upper duct being separated by a porous wall, the upper duct provided with a balancing column. The upper duct is filled with powder material and the lower duct is supplied with gas at a pressure that allows the potential fluidization of the powder material in the upper duct. The minimal bubbling speed, which corresponds to the maximum void fraction, is determined and the fluidization pressure is set to a value such that the fluidization speed of the gas is between 0.8 and 1.5 times the minimal bubbling speed, preferably between 0.9 and 1.3 times the minimal bubbling speed.

12 Claims, 3 Drawing Sheets

U.S. PATENT DOCUMENTS

| | | | |
|---|---|---|---|
| 4,692,068 A | * | 9/1987 | Hanrot et al. .................. 406/89 |
| 4,747,732 A | | 5/1988 | Hanrot et al. |
| 5,299,694 A | * | 4/1994 | Rambaud ...................... 209/135 |
| 6,382,881 B1 | | 5/2002 | Gasquet et al. |
| 6,402,437 B1 | * | 6/2002 | Gasquet et al. ............... 406/198 |
| 7,048,475 B2 | * | 5/2006 | Cloue et al. ................... 406/155 |

OTHER PUBLICATIONS

Abrahamsen et al. (Powder Technology, vol. 26, Issue 1, May-Jun. 1980).

Geldart (Powder Technology, vol. 7, Issue 5, May 1973, 285-292).

* cited by examiner

PROCESS FOR CONVEYING POWDERY MATERIALS WITHOUT SEGREGATION

The present application is a National Phase filing of International Application No. PCT/FR2008/000903, filed Jun. 26, 2008, which claims priority to French Patent Application No. 0705227, filed Jul. 19, 2007, both of which the present application claims priority to and the benefit of, and both of which are incorporated by reference herein in their entireties.

TECHNICAL FIELD OF THE INVENTION

The invention relates to a conveying process used to transport using substantially horizontal piping, material in powder form from a supply zone, typically a storage zone for said material in powder form, to a zone distant from the first zone and designed to be supplied with said material in powder form. This process more particularly relates to a process used to transport in substantially horizontal piping a material in powder form composed of a mixture of particles of which the particle size distribution and the density distribution is not necessarily unimodal but which, being homogeneous in the supply zone, must be delivered to the zone to be supplied with a homogeneity substantially as good as that of the initial mixture.

BACKGROUND OF THE INVENTION

A number of devices have been described that make it possible to transport powder material over long distances. Most of them call upon a fluidized bed transport technology. U.S. Pat. No. 3,268,264 described a process used to transport powder material in which a device is installed between the supply zone and the zone to be supplied, said device being a closed device including at least one substantially horizontal conveyor, which comprises a lower duct designed for the circulation of a gas and an upper duct designed for the circulation of powder material, said lower duct and said upper duct being separated by a porous wall that said gas can pass through and said lower duct being provided with at least one gas feed pipe. The lower duct is supplied with gas at a pressure that allows said powder material in said upper duct to be fluidized. Such a device, designed to transport coal in powder form to supply thermal power plants, describes a system of partitioning in the lower duct that makes it possible to vary the fluidization pressure along the air chute. In the operating conditions described in this document the fluidized material flows in turbulent state, with a fairly high fluidization gas flow rate.

French patent FR 2534891 (ALUMINIUM PECHINEY) also discloses a device making it possible to potentially fluidify powder material with a low fluidization gas flow rate so that the powder material is maintained in a state known as a "hyperdense phase" With such a device, substantially horizontal piping can be used to transport said material in hyperdense phase from a supply zone to a zone to be supplied. The device in FR 2354891 is distinguished from that in U.S. Pat. No. 3,268,264 primarily by the fact that the upper duct is provided with at least one balancing column the open top end of which communicates with the outside of said closed device and which is filled with powder material. The height to which the column is filled balances the pressure prevailing in the upper duct. The powder material is thereby placed in a state of potential fluidization: the gas+powder material mixture behaves like a liquid and remains motionless as long as no powder material is consumed. As soon as a vacuum is created in the zone to be supplied successive micro-landslides occur from said vacuum as far as the storage zone, so that the powder material circulates with a controlled flow, just sufficient for the needs of the zone to be supplied. Air is supplied at low pressure in comparison to the other dense phase transport processes and the movement of the gas, like that of the particles; occurs at low speed, which makes it possible to limit wear of the equipment and attrition of the product. The balancing column is preferably assembled vertically. Its section preferably lies between S/20 and S/200, S being the entire surface of said porous wall.

In European patent EP 1086035 (ALUMINIUM PECHINEY), the above process is improved by arranging the upper duct so that a gas bubble can be formed under pressure in its top part. In this way, operation is more stable: the risks of the conveyor, called "air chute", becoming completely jammed when there is no degassing, or incomplete degassing, in one of the balancing columns are reduced. Typically, walls forming a barrier and "solidifying" the bubble in the upper zone of said upper duct are fitted into the upper zone of said upper duct. The height of these barriers is lower than half the height of the upper duct. Typically, it is about one tenth of said height. Preferably, the upper zone of the upper duct is arranged so that a given bubble, bounded by said barrier walls, is associated with a balancing column of the device.

The device for conveyance on a potential fluidization hyperdense bed, as described in the previous patents, is used on a large scale, in particular to supply the tanks of recent plants performing igneous electrolysis of aluminum. The advantages of this device are well-known:
  continuous supply to the tanks, making it possible to keep the hoppers permanently full,
  little system maintenance required,
  relatively low air pressures required for fluidization (0.1 bar as compared with 6 bar for pneumatic transport in dense phase),
  low-speed movement of alumina, reducing wear of the equipment and attrition or agglomeration of the product.

But, while it has all the above-mentioned advantages, this device may have some disadvantages if certain special precautions are not taken:
  a less-than-optimal consumption of fluidization gas, and therefore of energy,
  fly-offs, i.e. significant recycling of alumina, via the balancing columns,
  a risk of particle size segregation by preferential fly-off of the finest particles.

In addition, in an electrolysis workshop, a great number (several dozen) of zones need to be supplied from only one storage zone. Moreover, the distance between the storage zone and the zone to be supplied may be great (several hundred meters). To meet with these requirements, the applicant proposed the device illustrated in EP-B-0179055, made up of a series of cascading conveyors: a primary conveyor connecting the storage zone to a series of secondary conveyor s, each one assigned to a tank and provided with side nozzles supplying hoppers integrated into the superstructure of the tank. This makes up a network of air chutes making it possible to transfer the alumina as a hyperdense bed over several hundred meters, typically between 400 and 800 meters. However, the applicant noted that at such distances, it was sometimes difficult to avoid the appearance of segregation phenomena in certain places.

Over and above this problem, encountered specifically in the context of the transport of alumina, the applicant attempted to better define the conditions in which a powder material resulting from a homogeneous mixture of particles of different particle sizes, or even a material also resulting from a homogeneous mixture of particles of different densities, can circulate in such air chutes without segregation occurring. In other words, the applicant sought to define the optimum conditions for conveying such powder material by potential fluidization, by which conditions said material has the same particle size distribution or the same density distribution when it arrives in the zone to be supplied.

BRIEF SUMMARY OF THE INVENTION

A first object of the invention is a process making it possible to transport, by potential fluidization, a powder material, in which a device is fitted between the supply zone, typically a storage zone of said powder material, and the zone to be supplied, said device being a closed device including at least one substantially horizontal conveyor, called an "air chute", which includes a lower duct designed for the circulation of a gas and an upper duct designed for the circulation of powder material. said lower duct and said upper duct being separated by a porous wall that said gas can pass through, said lower duct being connected to a gas feeding device, a process in which the upper duct is filled with said powder material and the lower duct is supplied with gas at a pressure, called the fluidization pressure, that allows the potential fluidization of said powder material in said upper duct. said upper duct being provided with at least one balancing column whose top end is open and whose bottom end communicates with said upper duct, so that the powder material penetrates into said column over a height that balances the pressure prevailing in the upper duct, said process being characterized in that a reference fluidization speed is first determined, equal to the fluidization speed of the gas for which the void fraction is maximum, and in that the fluidization pressure is set to a value such that the fluidization speed of said gas in said upper duct ranges between 0.8 and 1.5 times said reference fluidization speed, preferably between 0.9 and 1.3 times said reference fluidization speed.

The device used is a closed device communicating with the outside only by the supply zone and the zone to be supplied as far as the powder material is concerned, and only by the inlet piping, preferably single, and the open ends of the balancing columns as far as the fluidization gas is concerned. It includes at least one substantially horizontal conveyor, in the sense that it can be made up of a series or a network of conveyors of the horizontal or slightly tilted air chute type, with a slope typically less than 10°, preferably less than 5° in relation to the horizontal.

Figure 1:
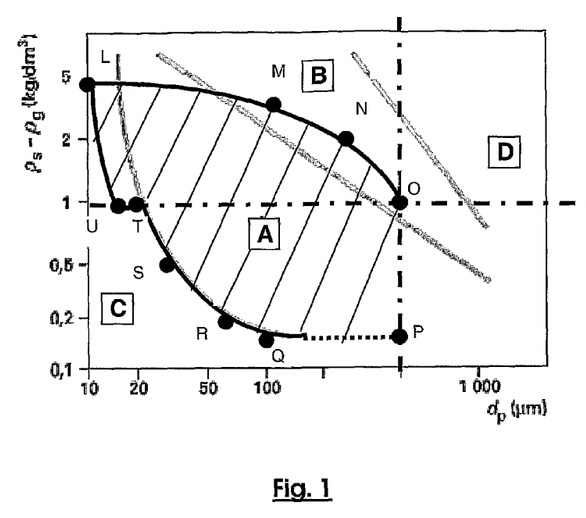
FIG. 1 shows the classification made by Geldart (Powder Technology, vol. 7, Issue 5, May 1973, 285-292), which is very widely used to classify powders according to their ability to fluidize. It classifies powders according to density and particle size: class A represents powders that fluidize easily, said to be "fusing", class B represents powders that fluidize relatively easily, said to be sandy powders, class C represents fine, cohesive powders that fluidize only with difficulty and class D represents granular powders, with irregular fluidization.

The powder material particularly suited for the process according to the invention is a easily fluidizable material, whose particles have a globally convex shape, with a shape factor (Ferret ratio) fairly close to 1, typically ranging between 0.5 and 2, and a size, for example represented by the median diameter D50, typically ranging between 15 micrometers and 500 micrometers. This material may also have a mono or multi-modal particle size distribution. It may also involve a mixture of materials of different chemical compositions and/or densities. Using the presentation suggested by Geldart in 1973 for classifying powders according to their fluidization ability, i.e. by presenting the material by a point whose X-coordinate is the logarithm of its average size $d_p$ and whose Y-coordinate is the logarithm of the difference between its average density $\rho_s$ and that of the fluidization gas $\rho_g$, it can be stated that this process applies particularly well to materials belonging to the shaded zone shown in FIG. 1, corresponding roughly to a polygon with the following 10 vertices: L(10; 5); M(100; 4); N(300; 2); O(500; 1); P(500; 0.15); Q(100; 0.15); R(60; 0.2); S(30; 0.5); T(20; 1); U(15; 1)

where the X-coordinates are the logarithms of the values between brackets on the left, which correspond to the sizes of the particles expressed in μm, and the Y-coordinates are the logarithms of the values between brackets on the right which correspond to the differences in densities expressed in kg/dm³. Since in practice few particles with a density of less than 1 are to be found, the field of powders best suited to being used with the process according to the invention can be defined as being the polygon LMNOU, i.e. the zone bounded by the following inequalities:
 a) $Y \geq 0$
 b) $Y+3.969X-4.668 \geq 0$
 c) $Y+0.097X-0.796 \leq 0$
 d) $Y+0.631X-1.864 \leq 0$
 e) $Y+1.357X-3.662 \leq 0$
where $X=\log_{10}(d_p)$, $d_p$ being expressed in micrometers and where $Y=\log 10(\rho_s-\rho_g)$, $\rho_s$ and $\rho_g$ being expressed in kg/dm³.

Powders that are easily fluidizable are characterized by:
 particulate fluidization which results in a strong expansion of the bed with the increase in the speed of fluidization and the appearance of bubbling when the air speed is significantly greater than the minimal fluidization speed;
 slow deaeration when fluidization is stopped: these powders remain fluid for a long time;
 a tendency to fusage during the draining of a hopper, i.e. fluid type flow through the obturator. The alumina used for the production of aluminum by electrolysis belongs to this category.

To characterize fluidization state of an easily-fluidizable powder, a layer of said powder is placed on a horizontal porous wall inside a column comparable to a vertical cylinder, which we will thereafter refer to as a "fluidization column". A gas is made to circulate upwards through the layer, its ascending speed being made to increase gradually. In practice, the gas flow rate is in fact varied. The following successive phenomena can then be observed:
 for the lowest speeds, the layer of solid particles remains on the grid without visible movement. If the speed is further increased particle vibrations are observed.
 from a speed $U_{mf}$ (minimal fluidization speed), an expansion of the layer is to be noted: the transition between the fixed state and the fluidized state of the bed of particles is in this way reached. In the following, we will refer to the ascending speed of the gas which makes it possible to attain a fluidized state as the fluidization speed.
 by increasing the upward speed of the gas still further, the bed continues to expand: the fluidized state can then be described. The particles are independent of each other. They are subjected to disordered movements of low amplitude. No translatory movement of the whole in relation to the fluid is to be observed. The upper surface of the bed is practically clear and horizontal. The bed is comparable to a liquid.
 as of a certain ascending speed of the gas, heterogeneities appear in the bed with bubbling phenomena (cavities are created in the fluid bed which grow bigger, coalesce and rise to the surface). The appearance of the surface of the fluid is then that of a boiling liquid. This is the bubbling fluidization state;
 if the gas speed increases still further, the bubbles, whose shape becomes irregular, gradually increase in size and number, dragging more and more solid particles in their wake: This is the turbulent fluidization state;
 above a certain speed, called the final particle freefall speed, the particles, driven by the gas current come out of suspension: this is the entrainment phenomenon. The application of this phenomenon is conventional mechanical transporting of powder solids, typically using conveyors called air slides.

Let us return to low fluidization speeds, which govern the conditions that must prevail within the upper duct of the air chute. According to the invention, a reference fluidization speed is first determined empirically or semi-empirically, equal to the mean velocity of gas fluidization corresponding to the maximum void fraction. This can be carried out for example using the fluidization column described previously.

The void fraction is directly connected to the apparent bulk density of the suspension. It is defined as being the difference between the apparent bulk density of the particles and the density of the suspension, expressed as a percentage as compared to the apparent bulk density of the particles. In other words, the void fraction $\varepsilon_{LF}$ is determined by the relationship:

$$\varepsilon_{LF} = \frac{(\rho_s - \rho_{LF})}{\rho_s},$$

where $\rho_s$ is the apparent bulk density of the particles and where the density of the suspension $\rho_{LF}$ is given by the relationship:

$$\frac{\text{particle mass}}{\text{suspension volume}} = \frac{m_p}{h_{LF} S}.$$

For a given suspension, mass $m_p$ being constant and section S of the column being constant the void fraction depends primarily on the height $h_{LF}$ taken on by the fluidized bed in said column. So a maximum void fraction corresponds to a minimum apparent bulk density of the suspension.

Figure 2:
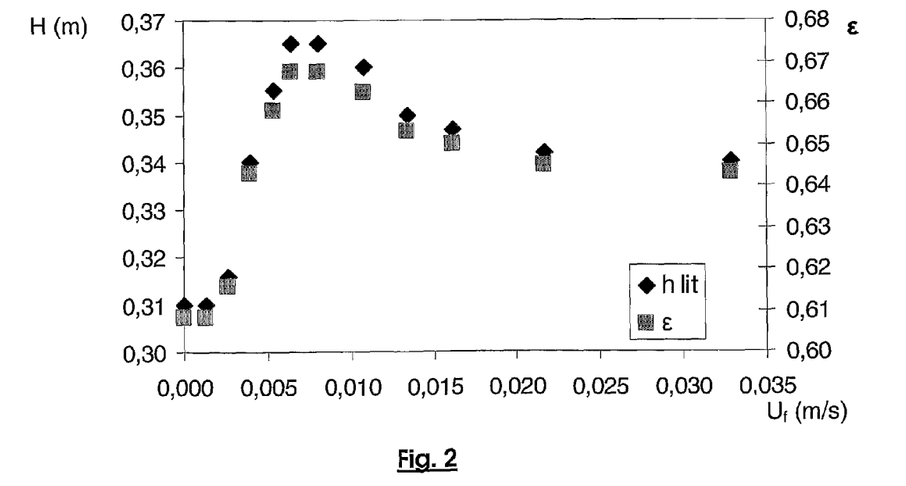
FIGS. 2 and 3, commented on above, show the results obtained on a smelting-grade alumina, i.e. alumina intended for the production of aluminum by igneous electrolysis.

FIG. 2 illustrates an example in which height H of a fluidized metallurgical alumina bed is measured in a fluidization column according to the ascending gas speed $U_f$; it can be seen that the height of the bed. and therefore its volume, starts to increase significantly as of a certain ascending speed, comparable to the minimum fluidization speed $U_{mf}$, here close to 3 mm/s, reaches a maximum, and then starts to decrease as of a $U_{mb}$ value, here about 7 mm/s, corresponding roughly to the appearance of the bubbles, and called for this reason "minimal bubbling speed", then reaching a substantially constant stage throughout the remainder of the bubbling fluidization phase. The results are given in two forms: rhombuses and left-hand Y axis illustrating the bed height as a function of the ascending speed, square and right-hand Y axis to illustrate the void function as a function to the fluidization speed.

Figure 3:
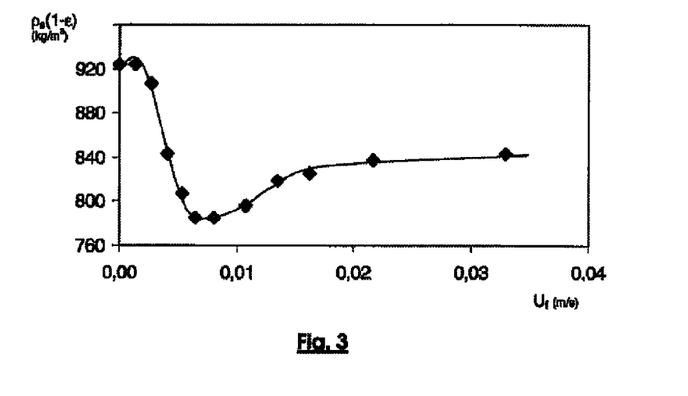

FIG. 3 shows the same results as those of FIG. 2, but expressed in terms of apparent bulk density as a function of the fluidization speed. It can be seen that in the vicinity of the minimum, the profile of the curve is flat although slightly dissymmetrical on either side of said minimum. This makes it possible to define a zone where the apparent density varies little and is close to the minimum. A first zone, corresponding to an apparent density at the most greater than 1.025 times the minimal apparent density, is determined by a fluidization speed ranging between 0.8 $U_{mb}$ and 1.5 $U_{mb}$. A more restricted zone, corresponding to an apparent density at the most equal to 1.012 times the minimal apparent density, is determined by a fluidization speed ranging between 0.9 and 1.3 times the minimum bubbling speed $U_{mb}$.

These observations, made on an expanded "static" bed, are transposed to the hyperdense bed as a substantially horizontal movement in an air chute. In other words, according to the invention, in order to achieve optimal transport of powder material by potential fluidization, a fluidization pressure is imposed such that a fluidization speed close to the minimal bubbling speed is set up in the upper duct corresponding to the lowest values of the apparent bulk density of the fluidized bed, given that this minimal bubbling speed is independent of the overall horizontal movement of the fluidized bed in the air chute.

According to the invention a fluidization speed within a range of values defined on an expanded "static" bed is aimed at, such as that observed in a simple fluidization column without any need to involve the geometry of the air chute. The bed is said to be "static" in the sense that the suspension does not undergo any overall horizontal movement. The reference fluidization speed, which is equal to the fluidization speed of the gas for which the void fraction is maximum, is called the minimal bubbling speed. It is primarily related to the physical characteristics of the material and does not depend on the geometrical characteristics of the container of the expanded bed. The speed range aimed at corresponds, as we have seen, to a range in which the void fraction varies little, it being equal or very close to the minimum. The applicant noted that these conditions were optimal for obtaining a piston-type flow in an air chute.

A definite fluidization speed can now be aimed at independently of the precise geometrical configuration of the air chute. However, the process according to the invention can give good results only if the air chute has been designed so that there is potential fluidization of the powder material at any point of the upper duct likely to be occupied by the suspension.

The gas fluidization speed in the upper duct is the average of the ascending vertical component of the gas speed in the upper duct. It can be measured by any appropriate means, for example by using grids of known permeability and hot wire anemometers. In the preferred embodiment described below, it can be more simply defined by measuring the gas flow rate injected into the lower duct and by dividing its value by the surface of the porous wall separating the lower duct from the upper duct.

The air chute is advantageously subdivided into sectors connected to each other, each comprising a balancing column and in each one of which the upper zone of the upper duct is occupied, as in EP 1086035, by a gas bubble under pressure. In this way, by suitably defining the geometry of these sectors, fluidization conditions that are substantially comparable with those of the "static" expanded bed in a fluidization column can be imposed, i.e. imposing a primarily vertical gas speed at the level of the suspension, the horizontal component of the gas speed becoming significantly different from zero only in the lower duct and in the bubble under pressure, in particular in the vicinity of the balancing column.

In this way, the gas is used only to put the suspension into expansion, without entraining particles horizontally, moves directly into the bubble and is removed by the balancing column. The horizontal movement of the particles is then created only by the supply system and drawing-off, the balancing columns being used for loading the whole of the air chute on a sector-by-sector basis.

In these conditions, the suspension behaves like a liquid and the pressure loss associated with transporting the solid particles is very low. It greatly depends on the kinetics of the particles and the conditions of friction of the suspension on the internal walls of the upper duct. But it is largely independent of the fluidization conditions. In this way, particularly high throughputs of powder material can be achieved without excessive consumption of fluidization gas. For example, with a material such as smelting-grade alumina, a fluidization speed of about 10 m/s could give, or even exceed mass throughputs of around 70 kg/m²s, whereas such flows would, using conventional pneumatic transport, require gas speeds of about 15 m/s, implying a gas consumption 150 times greater!

For each sector, the length of the upper duct the height and the section of the balancing column associated with said sector are advantageously defined so that taking into account the flow of material to be transported, the interior of the upper duct is in fluidization conditions close to those at the beginning of bubbling and the interior of the column is in turbulent state conditions. The gas speed at the outlet of the column must not exceed a certain limit beyond which the entrainment of fines would result in an unacceptable loss of powder material. In addition, the portions of the lower duct of two neighboring sectors are connected to each other but with a certain pressure loss being imposed there, typically using diaphragms, so that the gas pressure in the upper duct corresponds, in each sector, to a pressure for which the fluidization speed remains within the range concerned, namely between 0.8 and 1.5 (preferably between 0.9 and 1.3) times the minimal bubbling speed.

The applicant noted that by aiming at a mode of fluidization close to that corresponding to the minimum apparent density by volume of the suspension, not only could the powder be transported at a high rate but also, and especially, a piston-type flow could be set up in the air chute, i.e. a flow in which, discounting the effects of friction, any particle of an in-going section is subjected to an identical axial speed so that each suspension section preserves, between the supply zone and the zone to be supplied, the same distribution of particles in size and density. This is a question of conserving the distribution histograms, and not of spatial distribution because, since gravity can intervene anywhere along the path, the heaviest, and therefore densest and/or largest particles tend to gather in the lower part and the result of this may be that the section does not preserve its initial homogeneity. It is nevertheless true that there is no segregation, i.e. an accumulation at any location in the air chute of particles of a particular size or density. This result, important for many applications which involve the transfer over fairly large distance of multi-modal powders or mixtures of powders having different properties, is described below in the examples.

The reference fluidization speed corresponds, as we have seen, to the minimal bubbling speed, dependent on the physical characteristics of the powder material It can be determined empirically for example by using a fluidization column. It can be also determined semi-empirically using formulae from the literature and after resetting certain constants.

For example, the empirical formula suggested by Abrahamsen et al can be used. (Powder Technology, Vol. 26, Issue 1, May-June 1980) which gives the minimal bubbling speed according to part of a characteristic dimension of the particles ($d_p$ expressed in meters), and the density $\rho_g$ (in m³/kg) and the dynamic viscosity $\mu_g$ of the gas (in Pa·s), $$U_{mb} = 33 d_p \left(\frac{\rho_g}{\mu_g}\right)^{0,1}$$

The applicant noted that for smelting-grade alumina, the minimal bubbling speed $U_{mb}$ (expressed in m/s) can be estimated with a good degree of accuracy using this formula provided the median diameter D90 is taken as the characteristic size of the particles $d_p$.

In addition, the applicant noted that the balancing columns must be designed preferably so that with the fluidization aimed at in the upper duct a turbulent fluidization state is reached in the column, where the bed is made up of small elements of gas phase and solid phase which come and go quickly and where the surface of the bed is difficult to distinguish, the bottom part of the bed being significantly denser than the upper part. Designed in this way, the balancing columns behave as sources of loading of the air chute sectors with which they are associated. In other words, and to continue the analogy with the liquid behavior of the suspension, they behave like water towers installed all along said air chute. The gas speed at the outlet of the column must in addition be limited in order to avoid entraining a too great quantity of fine particles outside the device. In addition said column can be topped with an expansion vessel 60 of larger section (see FIG. 4) in order to decrease said speed and to recover part of the entrained fines.

BRIEF DESCRIPTION OF THE DRAWINGS

The shaded field corresponds to class A, to a small portion of class C and to a small portion of class B, both close to class A, which means that the powder material particularly suitable for transport according to the process of the invention is any category A fusing powder, the largest of the so-called cohesive powders of class C—the denser the material, the lower the minimum authorized size—and the finest of the so-called sandy powders of class B—the denser the material, the lower the maximum authorized size.

For the purposes of the patent, this shaded zone, resulting from experimental observations, has been represented by polygon LMNOPQRSTU, limited in practice to polygon LMNOU defined by a set of inequalities, but it is understood that these borders are not borders as strict their mathematical formulations may lead one to suppose and that this set must be regarded as also indicating the close vicinity of the zone thus bounded.

DETAILED DESCRIPTION OF THE INVENTION

EXAMPLES

Example 1

Figure 4:
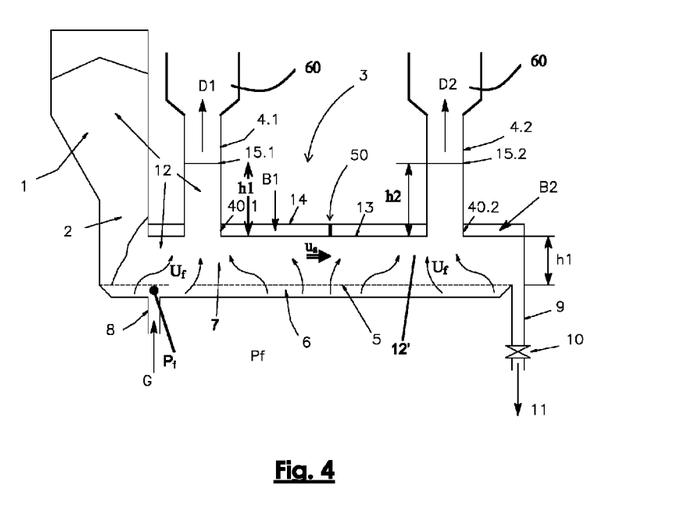
FIG. 4 is a schematic vertical cross-section of the device, here comprising a horizontal air chute, that can symbolize a portion of a primary conveyor or secondary conveyor, connecting the storage device to a means of removal.
Figure 5:
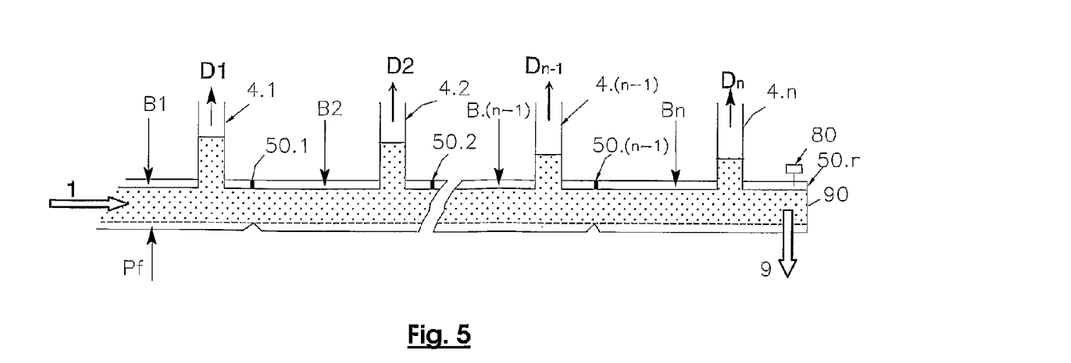
FIG. 5 is a diagram illustrating an air chute used within the framework of the process according to the invention and subdivided into sectors.

FIGS. 4 and 5

The device illustrated in FIG. 4 is composed of an overhead storage tank 1 for the material to be transported, connected by piping 2 to a conveyor 3 of the fluidization air chute or air slide type, balancing columns 4.1 and 4.2, and a means of removal 9 from the conveyor, which, using a controlled proportioning system 10, entrains powder material towards the zone to be supplied 11.

The overhead storage tank 1 contains the bulk powder material 12, at atmospheric pressure. This tank is filled with powder at one of the ends of the horizontal conveyor 3 via piping 2. Conveyor 3 is slender and is composed of a porous wall 5 separating the lower duct 6 and the upper duct 7 in which the powder material circulates.

A fluidization gas G is introduced through a pipe 8 into the lower duct 6, where it is subjected to the fluidization pressure $P_f$. This gas passes through the porous wall 5, also called the fabric, then through the powder material which fills the upper duct 7 of the conveyor. The gas is removed through the open top ends of the balancing columns 4.1 and 4.2. The filling levels 15.1 and 15.2, correspond to pressure heads $h_1$ and $h_2$ which balance the gas pressure in the upper duct.

The upper zone of the upper duct 7, is occupied by bubbles under pressure B1 and B2, whose volumes are perfectly bounded in space by:
the wall of the top part 14 of the upper duct 7,
the flat iron 50,
penetrations 40.1 and 40.2 of the balancing columns 4.1 and 4.2
and the top level 13 of the powder material 12.

FIG. 4 shows schematically how the fluidization gas G circulates, passing through fabric 5 then moves towards the balancing columns 4.1 and 4.2 on both sides of the barrier 50.

The material is actuated by an overall horizontal movement symbolized here by the vector associated with speed $u_s$. The gas passes through the porous wall 5 and runs out through suspension 12' with a globally upward movement. In a preferred embodiment of the invention, the air chute is designed so that speed $U_f$ of the gas at the level of the space occupied by the suspension is substantially vertical.

The air chute is provided with a means of removal 9 which transforms the horizontal movement of the powder material into a vertical or greatly tilted movement making it possible to supply a secondary conveyor, if the air chute is a primary conveyor, or a hopper integrated into the superstructure of an electrolysis tank, if the air chute is a secondary conveyor. The bottom part of the hoppers is equipped with controlled proportioning systems 10 making it possible to input the required quantities of alumina into the tank.

FIG. 5 shows an air chute subdivided into n sectors, each sector being associated with a bubble Bi (i=1 to n) and a balancing column Di (i=1 to n).

At the end of the air chute, the bubble $B_n$ is associated with the means of removal 9. The barrier 50.$n$ is in fact part of the end wall 90 of the conveyor, located downstream of the last balancing column 4.$n$. A pressure pick-up 80, located near the end 90 of air chute 3 makes it possible to measure the pressure in bubble $B_n$, which is the lowest pressure of the bubble because of the cumulated pressure losses (fairly weak, primarily due to the friction of the particles along the walls) in each sector. Knowing this value makes it possible to regulate the fluidization pressure $P_f$.

The portions of the lower duct of two neighboring sectors are connected to each other but with a certain pressure loss being imposed there, typically using diaphragms, so that the gas pressure in the upper duct corresponds, in each sector, to a pressure for which the fluidization speed remains within the range concerned, namely between 0.8 and 1.5 (preferably between 0.9 and 1.3) times the minimal bubbling speed.

Example 2

Figure 6:
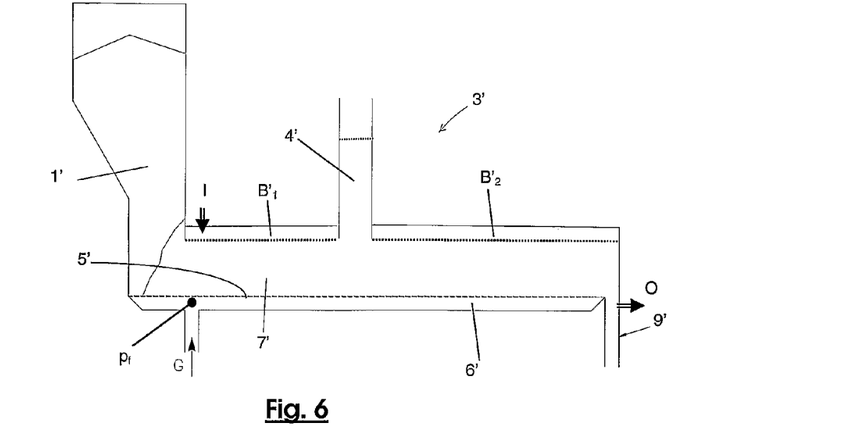
FIG. 6 is a diagram illustrating a pilot air chute used within the framework of the process according to the invention to define the optimal conditions for obtaining a transfer without segregation.
Figure 7:
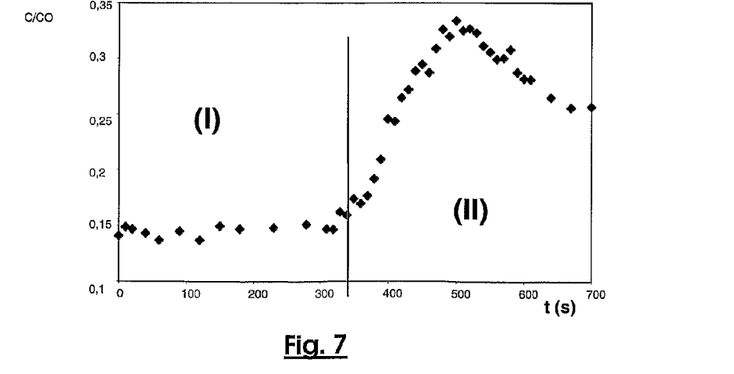
FIG. 7 illustrates the results of tracer proportioning performed on the pilot of FIG. 6.

FIGS. 6 and 7—Bringing to Light a Piston Flow

To define the optimum conditions for obtaining a piston flow, we used a controlled conveyor 3' such as is shown in FIG. 6.

Air chute 3' comprises an upper duct 7' of almost 5 meters in length with a section of 300 mm (height) by 160 mm (width). The upper duct 7' is separated from the lower duct 6' by a fabric 5' of given permeability.

A rotameter is used to read the total flow of the air G supplying the lower duct. Pressure $p_f$ is measured and recorded. The balancing column 4' has an internal diameter of 326 mm for a height of 5 m and it drops 50 mm into the air chute. This penetration of the balancing column 4' into the upper duct 7' forms a barrier which separates the upper zone of the upper duct 7' into two bubbles B'1 and B'2. The alumina supply column l' has a height of approximately 6 meters.

The material to be transported is metallurgical alumina AR75 ALUMINIUM PECHINEY. The tracer chosen comes from this same AR75 powder after coloring. It is fully miscible with the AR75 in the air chute and it has exactly the same flow properties as the alumina tested. The method of proportioning involves carrying out a whiteness test. It makes it possible to proportion a very small quantity of marker accurately, simply and easily and to compare this quantity with the quantity initially poured into the air chute.

A known quantity of marker is injected under pressure (at I) in the top part of the upper duct 7', just after column l' supplying solid. Accurate sampling (every 5 s) is performed (at O) by sampling from the middle of a nozzle located at the outlet of the horizontal part of the air chute. We have produced calibration curves using colored alumina. These curves can be used to determine the percentage of colored alumina present in the AR 75 quickly and simply. This information makes it possible to determine the residence time of the alumina and how it circulates in the air chute.

The tracing experiments were carried out for several solid and gas flow rates. FIG. 7 is typical of the results observed. It shows the changes in tracer concentration over time, expressed as a percentage of the tracer concentration compared to its initial concentration. The selected curve corresponds to a flow of solid of 42 kg/s/m$^2$ and a fluidization speed of 10 m/s. Initially (I), no modification of the tracer concentration is observed. In the second part (II) of the curve, a peak related to the passage of the tracer can be observed: the relatively abrupt rise is characteristic of a piston flow. The delay observed is related to the physical movement of the tracer from the point of injection to the sampling point. The concentration of the tracer does not return to its initial value because of the solid recycling system used in this pilot. The position of the tracer injection zone and that of the sampling zone show that mixing has taken place in the suspension section, i.e. a movement of particles in a plane perpendicular to the axis of the air chute, i.e. in the direction of the overall movement of the particles.

Example 3

Various Minimal Bubbling Speeds for Various Materials

The minimal bubbling speed was determined for various powder materials:
a smelting-grade alumina
   The alumina tested is the alumina marketed under the reference AR75 by ALUMINIUM PECHINEY. The minimal bubbling speed measured in a fluidization column is close to 7 mm/s and the minimal bubbling speed calculated by Abrahmsen's formula is close to 10 m/s.
a sand
   The sand tested has the following characteristics:
      $\rho_s$=2409 kg/m$^3$
      D10=170 µm
      D50=302 µm
      D90=503 µm
   It belongs to class B in Geldart's classification. Taking D50 as a characteristic size of the particles, this material is close to the border MN of polygon LMNOPQRSTU in FIG. 1. The minimal bubbling speed measured in a fluidization column is very close to the minimal fluidization speed. It is close to 65 m/s. The minimal speed calculated using Abrahmsen's formula is close to 75 m/s
a salt
   The salt tested is sodium chloride. It has the following characteristics:
      $\rho_s$=2082 kg/m$^3$
      D10=116 µm
      D50=425 µm
      D90=761 µm
   It also belongs to class B in Geldart's classification. Taking D50 as a characteristic size of the particles, this material is inside polygon LMNOPQRSTU in FIG. 1, close to the segment MN. The minimal bubbling speed measured in a fluidization column is very close to the minimal fluidization speed. It is close to 100 mm/s. The minimal speed calculated using Abrahmsen formula is close to 125 mm/s
   Insofar as sodium chloride is also transported to supply electrolysis tanks during the manufacture of sodium and chlorine, such a conveyor using potential fluidization and operating with a fluidization speed such as that claimed, may turn out to be particularly useful.
three artificial cements:
   These are mixtures of various minerals containing typically silica, alumina and calcium carbonate which, when reduced to powder by mechanical means, set in contact with water. Three varieties have been tested. They have the following characteristics:
   1) Raw cement: $\rho_s$=2780 kg/m$^3$
      D10=2.0 µm; D50=15.3 µm; D90=94.7 µm
      This material belongs to class C.
   2) Fine cement: $\rho_s$=3,090 kg/m$^3$
      D10=3.3 µm; D50=18.2 µm; D90=47.1 µm
      This material belongs to the boundary zone between class A and class C
   3) Extra-fine cement: $\rho_s$=3,130 kg/m$^3$
      D10=2.2 µm; D50=11.6 µm; D90=28.5 µm
      This material belongs to class C.

The tests carried out on a fluidization column made it possible to determine minimal fluidization speeds, which are similar those obtained for alumina; these are close to 3.3 mm/s, 3 mm/s and 4.3 mm/s respectively.

The tests carried out on a pilot air chute of the type such as is described in the previous example and illustrated in FIG. 6 have shown that the three types of powder start to run out on the horizontal corridor as of a fluidization gas speed of about 28-30 mm/s. It is noted that for this type of material, the application of Abrahmsen's formula with $d_p$=D90 does not make it possible to obtain a satisfactory estimate of the range of values to be aimed at for the fluidization speed.

The invention claimed is:

1. A process making it possible to transport, by potential fluidization, a powder material, in which a device is fitted between the supply zone and the zone to be supplied, said device being a closed device including at least one substantially horizontal conveyor, which includes a lower duct designed for the circulation of a gas and an upper duct designed for the circulation of powder material, said lower duct and said upper duct being separated by a porous wall that said gas can pass through, said lower duct being provided with at least one gas feeding hose, the process comprising:
   filling the upper duct with said powder material;
   supplying and the lower duct with gas at a fluidization pressure that allows the potential fluidization of said powder material in said upper duct, said upper duct being provided with at least one balancing column with an open top end, which is filled with said powder material to a height that balances a pressure prevailing in the upper duct;
   determining a minimal bubbling speed, the minimal bubbling speed being equal to a fluidization speed of the gas for which a void fraction is maximum; and
   setting the fluidization pressure to a value such that the fluidization speed of said gas in said upper duct ranges between 0.8 and 1.5 times said minimal bubbling speed.

2. A process according to claim 1 wherein the process makes it possible to transport easily fluidizable, fusing or sandy type, mono or multi-modal powder materials, whose particles are globally convex in shape with a shape factor ranging between 0.5 and 2, and have a D50 ranging between 15 microns and 500 microns.

3. A process according to claim 1, wherein the process is applied to transport powder materials whose characteristic particle size $d_p$, represented by the median diameter D50, and the average density $\rho_s$ belong to the field defined by the following inequalities:
   a) Y≧0
   b) Y+3.969X−4.668≧0
   c) Y+0.097X−0.796≦0
   d) Y+0.631X−1.864≦0
   e) Y+1.357X−3.662≦0
where $X=\log_{10}(d_p)$, $d_p$ being expressed in micrometers and where $Y=\log_{10}(\rho_s-\rho_g)$, $\rho_s$ and $\rho_g$ being expressed in kg/dm$^3$, $\rho_g$ being the bulk density of the fluidization gas.

4. A process according to claim 1, wherein said minimal bubbling speed is determined prior to supplying the lower duct with the gas by observing, in a fluidization column, the expansion of a suspension resulting from the mixture of said powder material and said fluidization gas and by recording the fluidization speed corresponding to the maximum volume occupied by said suspension.

5. A process according to claim 1, further comprising determining said fluidization speed by measuring the ascending vertical component of the gas speed at several points on the upper duct and by taking the average of the values measured.

6. A process according to claim 1, wherein the conveyor is subdivided into sectors connected to each other, each comprising a balancing column and in each of which the upper zone of the upper duct is occupied by a gas bubble under pressure, the length of the sector, the height and the section of the associated balancing column being defined so that the speed of gas is primarily vertical at the level of the suspension, the horizontal component becoming significantly different from zero only in the lower duct and in the bubble under pressure.

7. A process according to claim 6, further comprising determining a mean fluidization velocity by dividing the flow rate of the gas injected into the lower duct by the surface of the porous wall separating the lower duct from the upper duct.

8. A process according to claim 6, wherein each balancing column associated with each sector is configured such that when the fluidization speed in the upper duct is in the range of between 0.8 and 1.5 times said minimal bubbling speed, a state of turbulent fluidization is reached in the balancing column.

9. A process according to claim 8, wherein at least one balancing column is surmounted by an expansion vessel.

10. A process according to claim 6, further comprising imposing a pressure loss between portions of the lower duct of two neighboring sectors so that the pressure prevailing in the upper duct corresponds, in each sector, to a pressure for which the fluidization speed of said gas in said upper duct ranges between 0.8 and 1.5 times said minimal bubbling speed.

11. A process according to claim 1, wherein said powder material is a metallurgical alumina and in which said minimal bubbling speed is determined prior to supplying the lower duct with the gas using the following empirical formula:

$$U_{mb} = 33 d_p \left( \frac{\rho_g}{\mu_g} \right)^{0.1}$$

where the density $\rho_g$ is expressed in m³/kg, the dynamic viscosity of the gas $\mu_g$ is expressed in Pa·s, $U_{mb}$ is expressed in m/s and where the characteristic particle size $d_p$, expressed in meters, corresponds to the median diameter D90.

12. A process according to claim 1, wherein the fluidization pressure is set to a value such that the fluidization speed of said gas in said upper duct ranges between 0.9 and 1.3 times said minimal bubbling speed.

* * * * *